United States Patent [19]

Adoline

[11] 4,400,902
[45] Aug. 30, 1983

[54] AUTOMATIC FISHING APPARATUS

[76] Inventor: Louis J. Adoline, 1988 Michigan St., Toledo, Ohio 43611

[21] Appl. No.: 267,009

[22] Filed: May 26, 1981

[51] Int. Cl.³ .............................................. A01K 91/06
[52] U.S. Cl. .......................................... 43/15; 43/19.2
[58] Field of Search ............................ 43/15, 16, 19.2

[56] References Cited

U.S. PATENT DOCUMENTS 1,475,408  11/1923  Reed ...................................... 43/15
2,841,912   7/1958  Eining .................................... 43/15

FOREIGN PATENT DOCUMENTS 62781   7/1891  Fed. Rep. of Germany ........... 43/15
134227  of 1902 Fed. Rep. of Germany ........... 43/15
19535   of 1890 United Kingdom .................... 43/15

Primary Examiner—Nicholas P. Godici
Assistant Examiner—Charles L. Willis
Attorney, Agent, or Firm—Fisher, Gerhardt, Crampton & Groh

[57] ABSTRACT

An automatic fishing device in which a pull on a line by a fish causes a leaf spring to exert a momentary pull in the opposite direction on the line. A subsequent force applied to the line releases it from contact with the leaf spring and the device then functions as a fishing rod wherein the line is guided but can be retrieved or released free of other constraint.

3 Claims, 6 Drawing Figures

AUTOMATIC FISHING APPARATUS

This invention relates to fishing equipment, in particular, automatic fishing devices which automatically set the hook when a fish pulls on the line.

The development of automatic fishing devices goes back more than a century. Many of the devices are designed for use as set lines or fish traps. Other automatic fishing devices are usable in conjunction with, or in place of fishing rods and reels.

All of the various automatic fishing devices that have been developed demonstrate one or more of the following shortcomings: excessive weight; complex and expensive parts; mechanisms that are difficult to engage; friction causing mechanisms which restrict the line while the fish is fought, leading to breakage of lines and loss of fish; insensitive mechanisms which do not react to gentle pulls by fish; line associated mechanisms which are exposed to the hazards of submergence and breakage of the line; and mechanisms which tend to snag the line while the fish is fought.

It is an object of this invention to provide an automatic fishing device which sets the hook automatically when a fish pulls on the line.

Another object of this invention is to provide an automatic fishing device which also functions as a fishing rod, guiding a line in such a way that the line can be freely retrieved or released.

Another object of this invention is to provide an automatic fishing device that is lightweight, simple and economical to manufacture.

A further object of this invention is to provide an automatic fishing device that does not cause excessive friction on the fishing line when the line is retrieved or released.

One more object of this invention is to provide an automatic fishing device that does not have parts that snag the line while a fish is fought.

Still another object of this invention is to provide an automatic fishing device that can be engaged easily and quickly.

One other object of this invention is to provide an automatic fishing device to which a fishing reel can be attached and with which the drag mechanism of a fishing reel will function normally.

The automatic fishing device embodying the present invention incorporates an elongated rod member, which has a trigger member moveable between first and second positions, mounted on one end and a line anchored at the other end. There is a spring member, on the elongated rod member adjacent the trigger member. The spring member is deflectable radially outward from a tensioned position adjacent the elongated rod member to an untensioned position. The spring member is retainable in the tensioned position by the trigger member in the first position. There are guide means on the trigger member which receive the line from the anchored end of the line and guide it over the trigger member to move the trigger member from the first position to the second position when the line is pulled through the guide means. The guide means guide the line to contact the spring member momentarily when the spring member moves from the tensioned position to the untensioned position.

Various other objects and advantages of the automatic fishing apparatus will be readily apparent from the following description and from the drawings in which.

Figure 1:
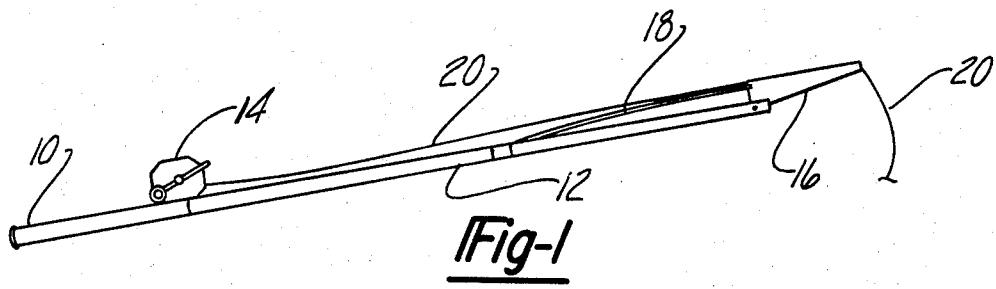
FIG. 1 is a perspective view of a preferred embodiment of the automatic fishing apparatus.

A preferred example of the present invention is illustrated in FIG. 1. In the figures, the device in general is indicated by the numeral 10. It has an elongated rod member 12. A fishing reel 14 is shown attached to one end of the elongated rod member 12. A trigger member 16 is attached to the other end. A leaf spring 18 is attached to the elongated rod member 12 adjacent to the trigger member 16. A line 20 is guided over the trigger member 16 to the fishing reel 14.

Figure 2:
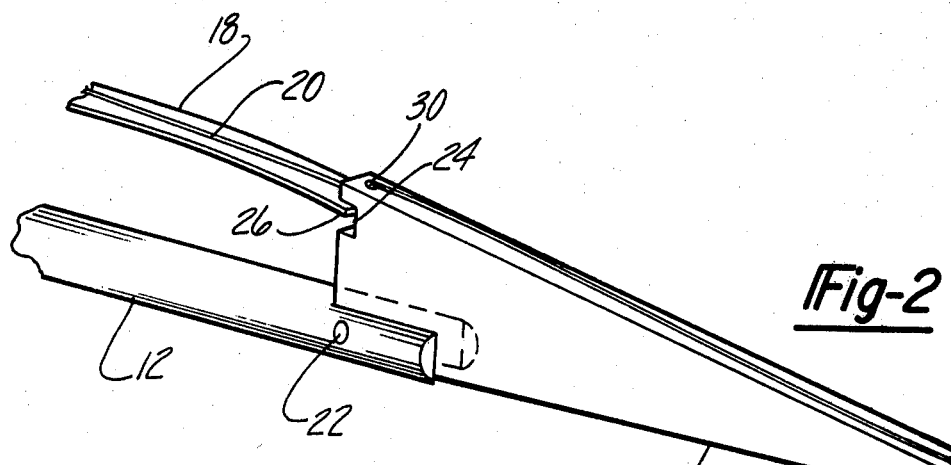
FIG. 2 is a perspective view at an enlarged scale of the forward end of the automatic fishing apparatus.

FIG. 2 shows the forward end of the device 10 in detail. The elongated rod member 12 is forked at one end and the trigger member 16 is attached to that end of the elongated rod member 12 by means of a pivot pin 22.

The trigger member 16 has a notch 24. The leaf spring 18 has a free end 26. The trigger member 16 incorporates a forward line guide hole 28 and a rear line guide hole 30.

The device 10 is operated by a fisherman who holds the automatic fishing apparatus 10 with one hand and sets it with the other. In setting the device 10 the trigger member 16 is moved on the pivot pin 22 and the leaf spring 18 is tensioned so that the notch 24 engages the free end 26 of the leaf spring 18. The automatic fishing apparatus 10 is then in the state of operation illustrated in FIGS. 2 and 3. The line 20 is guided along but not in contact with the free end 26 of the leaf spring 18 by means of a forward line guide hole 28 and a rear line guide hole 30. In the preferred embodiment of the device 10, the forward line guide hole 28 and the rear line guide hole 30 are holes in a hard plastic trigger member 16. The line 20 moves freely through the forward line guide hole 28 and the rear line guide hole 30. Once the automatic fishing apparatus 10 is set, it may be retained by the fisherman in his hand or it may be placed upon a support.

Figure 3:
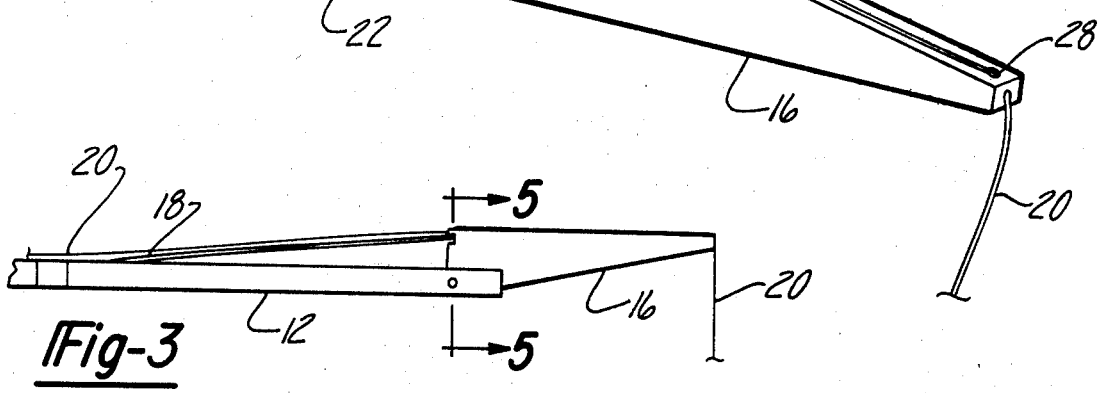
FIG. 3 is a side elevation of the forward end of the automatic fishing apparatus illustrated in one of its states of operation.
Figure 4:
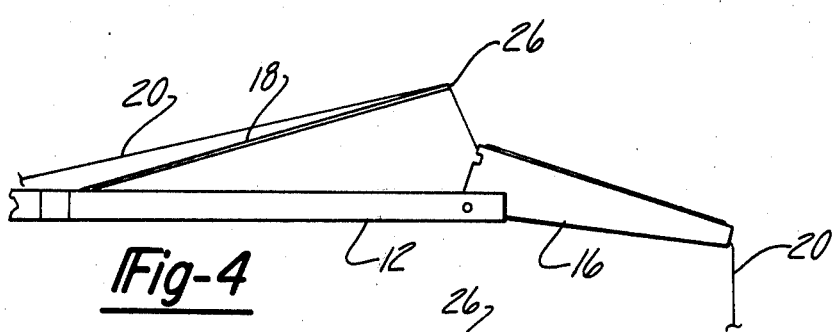
FIG. 4 is a side elevation of the forward end of the automatic fishing apparatus in another state of operation.
Figure 6:
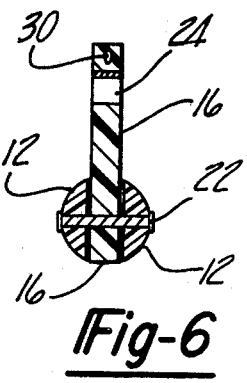
FIG. 6 is a cross-section of the forward end of the device on line 6—6 in FIG. 3.
Figure 5:
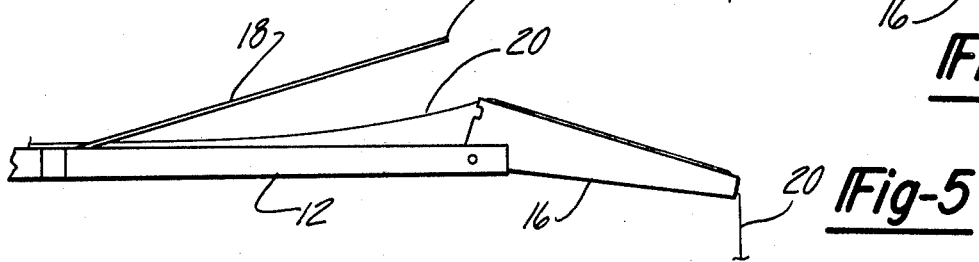
FIG. 5 is a side elevation of the forward end of the automatic fishing apparatus in an additional state of operation.

The device 10 assumes states of operation illustrated in FIGS. 4 and 5 by means of pulls on the line 20. When the line 20 is pulled in a direction downward from the elongated rod member 12 as seen in FIG. 3 the line 20 moves freely through the front line guide hole 28 and the rear line guide hole 30, but is impeded by the friction of its contact with the trigger member 16 sufficiently to pivot the trigger member 16. In pivoting, the notch 24 moves out of contact with the free end 26 of the leaf spring 18. The leaf spring 18 then is released to assume an untensioned position seen in FIG. 4. In doing so, it comes into contact with the line 20 and exerts a pull on the line 20. The strength of the pull is determined by the resiliency of the leaf spring 18 and the length of line 20 retrieved by movement of the leaf spring 18 to its untensioned position.

The free end 26 of the leaf spring 18 is relatively narrow and flattened so that further pulling on the line 20 by a struggling fish or otherwise, when the automatic fishing apparatus 10 is in the state of operation illustrated in FIG. 4, results in the release of the line 20 from contact with the free end 26 of the leaf spring 18 and movement to the position illustrated in FIG. 5. The line 20 may then be retrieved or released free of constraints other than the front line guide hole 28 and the rear line guide hole 30. A hooked fish can be fought in the same manner that it would be fought with an ordinary fishing rod. The device can be used with a fishing reel 14 attached to it. If so, the drag mechanism of the fishing reel 14, would function normally to protect the line 20 from breakage since the automatic fishing apparatus 10 would not unduly strain the line 20 while the fish was fought.

In summary, the automatic fishing apparatus 10 operates in the following manner. An outward pull on a line 20 through a front line guide hole 28 and a rear line guide hole 30 pivots a trigger member 16 which is attached to the front end of an elongated rod member 12 to which the line 20 is anchored. In pivoting, a notch 24, in the trigger member 16 releases a free end 26 of a leaf spring 18. The leaf spring 18 then assumes an untensioned position from a tensioned postion, in which it was held by the trigger member 16, prior to the pull on the line 20. In moving, the free end 26 of the leaf spring 18 exerts an inward pull on the line 20. A subsequent pull on the line 20 releases it from contact with the free end 26 of the leaf spring 18 and the device 10 then performs in the manner of an ordinary fishing rod.

The embodiments of the invention in which an exclusive property or privilege is claimed are defined as follows:

1. An automatic fishing device comprising: an elongated rod member, an elongated trigger member pivotally mounted on and projecting beyond one end of said elongated rod member and being movable between first and second positions, a line having one end anchored at the other end of said elongated rod member, a leaf spring member on said elongated rod member adjacent to said trigger member and deflectable outwardly from a tensioned position to an untensioned position, a notch formed in said trigger member and being engageable with said leaf spring to retain the latter in said tensioned position when said trigger is in said first position, guide means formed by guide holes at opposite ends of said trigger member, said holes receiving said line from said anchored end and guiding said line over said trigger member to move said trigger member from said first to said second position when said line is pulled, said guide means guiding said line to momentarily remain in contact with said spring member when said spring member moves from said tensioned position to said untensioned position.

2. The automatic fishing apparatus of claim 1 wherein said elongated rod member includes means for attaching a fishing reel.

3. An automatic fishing device comprising: a fishing reel; a line anchored to said fishing reel; an elongated rod member having means for attaching said fishing reel at one end; a leaf spring which is elongated and has one end anchored to said elongated rod member and the other end free, said spring being deflectable outward from a tensioned position adjacent said elongated rod member to an untensioned position; a trigger member mounted to the other end of said elongated rod member and projecting beyond the end of said elongated rod member, said trigger member having a notch engageable with said free end of said leaf spring, to receive the free end of said leaf spring when said trigger member is in a first position and said leaf spring is in said tensioned position, said trigger member pivotable to a second position to release said free end of said leaf spring from said notch, said trigger member having a front line guide hole and a rear line guide hole to retain said line and to guide said line, from said fishing reel over said trigger member to move said trigger member from said first position to said second position, when said line is pulled through said guide means, to guide said line in contact with the free end of said leaf spring momentarily, when said leaf spring moves from said tensioned position to said untensioned position.

* * * * *